United States Patent
Grion

(10) Patent No.: US 8,971,149 B2
(45) Date of Patent: Mar. 3, 2015

(54) METHOD, DEVICE AND PROCESSING ALGORITHM FOR MULTIPLE AND NOISE ELIMINATION FROM MARINE SEISMIC DATA

(75) Inventor: Sergio Grion, Surrey (GB)

(73) Assignee: CGGVeritas Services SA, Massy Cedex (FR)

( * ) Notice: Subject to any disclaimer, the term of this patent is extended or adjusted under 35 U.S.C. 154(b) by 471 days.

(21) Appl. No.: 13/468,539

(22) Filed: May 10, 2012

(65) Prior Publication Data

US 2013/0301386 A1  Nov. 14, 2013

(51) Int. Cl.
*G01V 1/38* (2006.01)

(52) U.S. Cl.
USPC .......................................................... 367/24

(58) Field of Classification Search
USPC ........................................ 367/24, 38; 702/14
See application file for complete search history.

(56) References Cited

U.S. PATENT DOCUMENTS

2006/0291328 A1* 12/2006 Robertsson et al. ............ 367/24
2011/0182139 A1* 7/2011 van Manen et al. ............ 367/24

FOREIGN PATENT DOCUMENTS

| WO | 2010/082126 A2 | 7/2010 |
| WO | 2010/091115 A2 | 8/2010 |
| WO | 2011/150126 A2 | 12/2011 |

OTHER PUBLICATIONS

Zabihi et al., "Enhanced wavefield separation of OBC data," 73rd EAGE conference and exhibition, expanded abstract, SPE EUROPEC, Vienna, Austria, May 23-26, 2011.

K. L. Craft, "Geophone noise attenuation and wavefield separation using multi-dimensional decomposition technique," 70th EAGE conference and exhibition, expanded abstract, G037, Rome, Italy, Jun. 9-12, 2008.

Dmitri Lokhstanov, "Suppression of sea-floor effects from multicomponent seafloor data," 62nd EAGE conference and exhibition, expanded abstract L52, Glasgow, Scotland, May 29-Jun. 2, 2000.

Wood et al., "The debubbling of marine source signatures," Geophysics, vol. 43, No. 4, Jun. 1978, pp. 715-729.

L. Amundsen in "Wavenumber-based filtering of marine point source data," Geophysics, vol. 58, No. 9, Sep. 1993, pp. 1335-1348.

Amundsen, "Elimination of free-surface related multiples without need of a source wavelet," Geophysics, vol. 66, No. 1, Jan.-Feb. 2001, pp. 327-341.

John R. Berryhill "Submarine Canyons-Velocity replacement by wave-equation datuming before stack," Geophysics, vol. 51, No. 8, Aug. 1986, pp. 1572-1579.

UK Search Report mailed Nov. 11, 2013, in related British Application No. GB1308395.1.

* cited by examiner

*Primary Examiner* — Mark Hellner
(74) *Attorney, Agent, or Firm* — Patent Portfolio Builders PLLC

(57) ABSTRACT

Computing device, computer instructions and method for simultaneously denoizing and attenuating multiples in seismic data recorded with seismic receivers. The method includes receiving the seismic data, wherein the seismic data includes a pressure P component and a vertical Z component; separating the seismic data into up-going U wave-fields and down-going D wave-fields; calculating an up-down deconvolution R based on the up-going U and the down-going D wave-fields; generating a multiple model M based on the up-down deconvolution R; and adaptively subtracting the multiple model M from the pressure P component to obtain a corrected pressure $P_{free}$ component from which simultaneously the noise and the multiples were removed. A multiple is a wave-field that propagates from a source to a receiver and experiences more than one reflection.

20 Claims, 5 Drawing Sheets

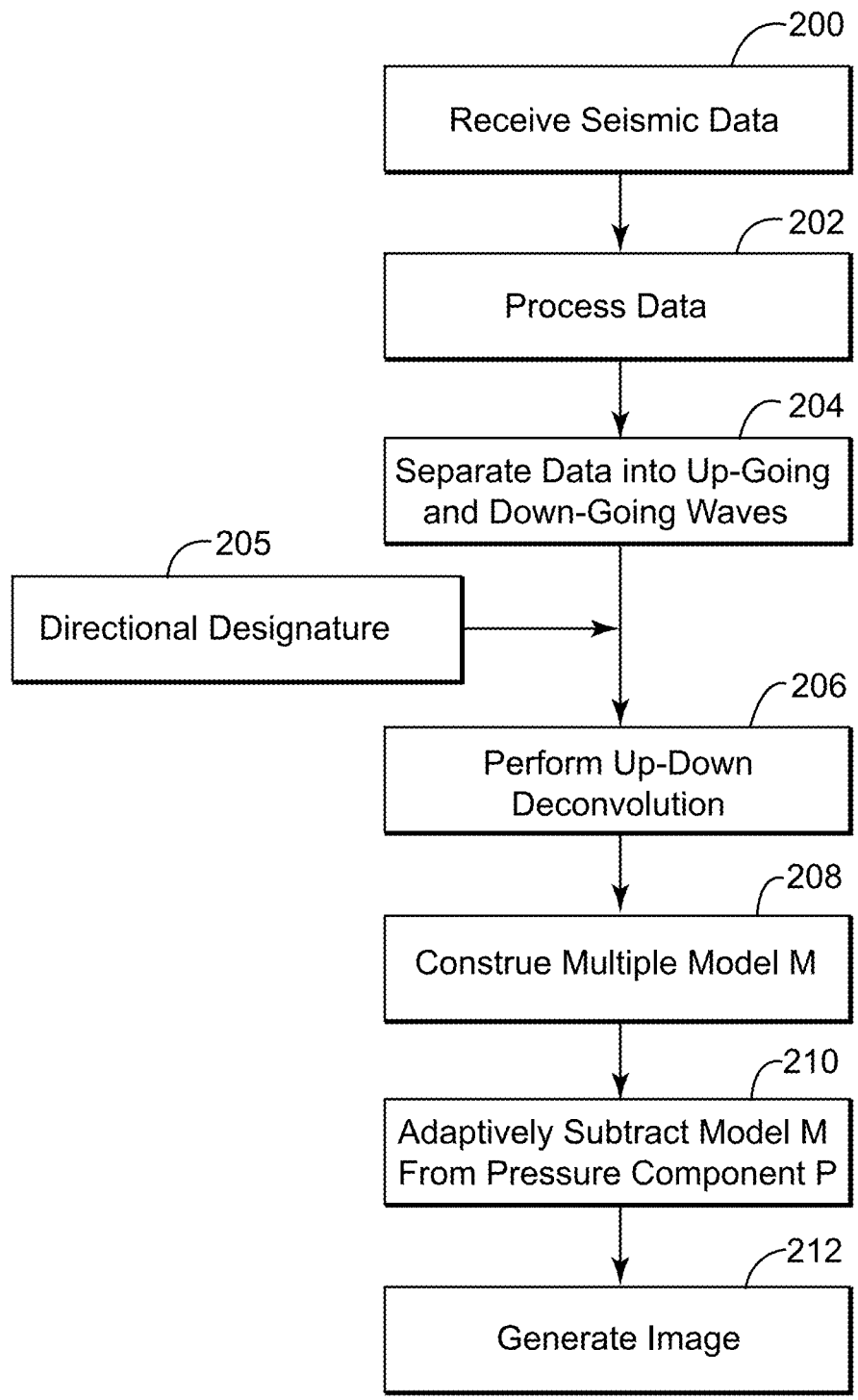

METHOD, DEVICE AND PROCESSING ALGORITHM FOR MULTIPLE AND NOISE ELIMINATION FROM MARINE SEISMIC DATA

BACKGROUND

1. Technical Field

Embodiments of the subject matter disclosed herein generally relate to methods and systems for processing marine seismic data and, more particularly, to mechanisms and techniques for removing multiples and noise from marine seismic data.

2. Discussion of the Background

Marine seismic data acquisition and processing generate a profile (image) of the geophysical structure under the seafloor. While this profile does not provide an accurate location for oil and gas reservoirs, it suggests, to those trained in the field, the presence or absence of them. Thus, providing a high-resolution image of the subsurface is an ongoing process.

Generally, a seismic source is used to generate a seismic signal which propagates into the earth, and it is at least partially reflected by various seismic reflectors in the subsurface. The reflected waves are recorded by seismic receivers. The seismic receivers may be located on the ocean bottom, close to the ocean bottom, below a surface of the water, close to the surface of the water, close to the surface of the earth, or in boreholes in the earth. The recorded seismic datasets, e.g., travel-time, may be processed to yield information relating to the location of the subsurface reflectors and the physical properties of the subsurface formations, e.g., to generate an image of the subsurface.

Many marine datasets suffer from high levels of noise, which make the task of processing and interpretation difficult. This is more pronounced for low fold datasets. Modern single sensor high fold datasets can also exhibit high noise levels due to poor coupling and ground or mud roll. For such datasets, it can be more practical to reduce the noise level rather than to interpolate even more densely.

Further, the marine datasets are also affected by multiples. Multiples occur when seismic energy is reflected between the sea-surface and the ocean-bottom or between the sea-surface and various reflector structures of the subsurface. The concept of multiples is illustrated in FIGS. 1A-C. FIG. 1A shows a source 10 generating a seismic wave 12 that propagates downward, toward the ocean bottom 14. The seismic wave 12 further propagates in the subsurface and gets reflected at a reflector 16. Then, the reflected wave 18 (primary reflection) propagates upward, toward the sea-surface 22. A receiver 20, located in the water, is configured to record the reflected wave 18. It is noted that a primary reflection wave experiences only one reflection. An analysis of the seismic signal generated by the primary reflection provides information about the geological feature (reflector) responsible for reflecting the seismic wave 12.

However, besides the seismic waves shown in FIG. 1A, there are other waves that do not follow the paths described above and form the multiples. For example, FIG. 1B shows that a seismic wave 24 that propagates upward and gets reflected from the sea-surface 22. Then, the reflected wave 26 propagates toward the ocean-bottom 14 and again gets reflected. This process may continue with the wave getting reflected by the reflector 16 before being recorded by the receiver 20. Other paths may be imagined that are different from those shown in FIGS. 1A and 1B and form the multiples. One more example is shown in FIG. 1C in which a seismic wave 28 is reflected by other reflectors 30 and 32 and also by the sea-surface 22 before being recorded by the receiver 20. Thus, in this case, the recorded seismic wave 34 is a down-going wave while previously, the recorded wave was an up-going wave.

The seismic waves recorded by the receiver 20 in FIGS. 1B-C have a different travel-time from the source to the receiver than will the energy that follows the primary path of FIG. 1A. Also, a multiple experiences more than one reflection. Thus, these seismic waves are an undesirable source of contamination of seismic data because they tend to obscure the interpretation of data produced by the primary reflection.

It is known that the noise and multiples are most often present in the recorded seismic data. There are conventional methods for eliminating the noise or the multiples from the recorded seismic data. For example, such a method may rely on the concept of wave-field separation, i.e., separating the up-going components (wave 18 in FIG. 1A) from the down-going components (wave 34 in FIG. 1C). However, the wave-field separation results are sometimes affected by high levels of noise on a vertical component Z, while a pressure component P, is in general of good quality. It is noted that the vertical component Z is recorded by a geophone or accelerometer while the pressure component P is recorded by a hydrophone and these devices together form the receiver 20.

The Z component is used for ocean bottom seismic (OBS) processing and in general, when processing multi-component data, including multi-component streamer data. For example, Zabihi et al., ("Enhanced wavefield separation of OBC data," $73^{rd}$ EAGE conference and exhibition, expanded abstract, 2011) indicates that "Z is needed to achieve complete prestack wavefield separation and also to drive processes such as mirror imaging and up-down deconvolution."

Using the Z component, three noise-attenuation strategies are possible. Noise can be removed prior to wave-field separation, during wave-field separation, or after wave-field separation. Several noise-attenuation algorithms known in the art and practiced in seismic data processing centers attempt noise-attenuation before wave-field separation (e.g. Craft, "Geophone noise attenuation and wavefield separation using multi-dimensional decomposition technique," $70^{th}$ EAGE conference and exhibition, expanded abstract G037, 2008).

The document of Zabihi et al. proposes a method for attenuating the noise during wave-field separation, by making use of the fact that separation into up- and down-going waves simplifies the recorded wave-field and allows for improved performance of signal processing algorithms.

Regarding the multiples, a method (see Lochstanov, "Suppression of sea-floor effects from multicomponent seafloor data," $62^{nd}$ EAGE conference and exhibition, expanded abstract L52, 2000), proposes an adaptive method for removal of free surface effects from the up-going wave-field. This method involves deriving a multiple model using up-down deconvolution results and then performing an adaptive subtraction of this model from the up-going wavefield. However, because both the up-going wave-field and the model are in general affected by noise, this approach does not perform noise attenuation.

Thus, it can be seen that the existing methods either remove the noise or the multiples during or pre-wave-field separation. Therefore, there is a need to have a new mechanism or method that jointly performs noise and multiple attenuation.

SUMMARY

According to an exemplary embodiment, there is a method for simultaneously denoising and attenuating multiples in seismic data recorded with seismic receivers. The method includes a step of receiving the seismic data, wherein the seismic data includes a pressure P component and a vertical Z component; a step of separating the seismic data into up-going U wave-fields and down-going D wave-fields; a step of calculating an up-down deconvolution R based on the up-going U and the down-going D wave-fields; a step of generating a multiple model M based on the up-down deconvolution R; and a step of adaptively subtracting the multiple model M from the pressure P component to obtain a corrected pressure $P_{free}$ component from which simultaneously the noise and the multiples were removed. A multiple is a wave-field that propagates from a source to a receiver and experiences more than one reflection.

According to another exemplary embodiment, there is a computing device for simultaneously denoising and attenuating multiples in seismic data recorded with seismic receivers. The computing device includes an interface configured to receive the seismic data, wherein the seismic data includes a pressure P component and a vertical Z component; and a processor connected to the interface. The processor is configured to, separate the seismic data into up-going U wave-fields and down-going D wave-fields, calculate an up-down deconvolution R based on the up-going U and the down-going D wave-fields, generate a multiple model M based on the up-down deconvolution R, and adaptively subtract the multiple model M from the pressure P component to obtain a corrected pressure $P_{free}$ component from which simultaneously the noise and the multiples were removed. A multiple is a wave-field that propagates from a source to a receiver and experiences more than one reflection.

According to yet another exemplary embodiment, there is a computer readable medium configured to permanently store computer instructions such that, when a computer executes the instructions, to simultaneously denoise and attenuate multiples in seismic data recorded with seismic receivers. The instructions execute the method steps noted above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 is a flowchart illustrating a method for denoising and removing multiples from seismic data according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to OBC seismic data that is jointly denoised and multiple attenuated post-wave-field separation. However, the embodiments to be discussed next are not limited to OBC as they may be extended or used with any marine data, e.g., streamer data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a novel method jointly attenuates noise and multiples after wave-field separation. Thus, in one embodiment, raw seismic data is received by an appropriate computer application and/or computing device and it is separated into up-going (U) and down-going (D) waves. The separation may take place above or below the ocean-bottom. The method also performs up-down deconvolution to obtain a response R of the earth, where R is an estimated of the primary wave-field. More specifically, the R may be understood, if using a 1-dimensional (1D) example of the earth, to be the deconvolution of U and D, where D corresponds to the energy that enters the earth during the survey duration and U corresponds to the energy that exits the earth as the earth's response to the energy corresponding to D. Using the signal processing language, D corresponds to the energy that goes into a filter, R is the filter, and U corresponds to the output of the filter.

Based on the up-down deconvolution R and the pressure component P of the recorded seismic data, a model M for the multiples is defined. The model M may also include a redatuming term relative to the ocean-bottom. The model is then adaptively subtracted from the pressure component P for obtaining the denoised and multiple attenuated seismic data.

Figure 1A:
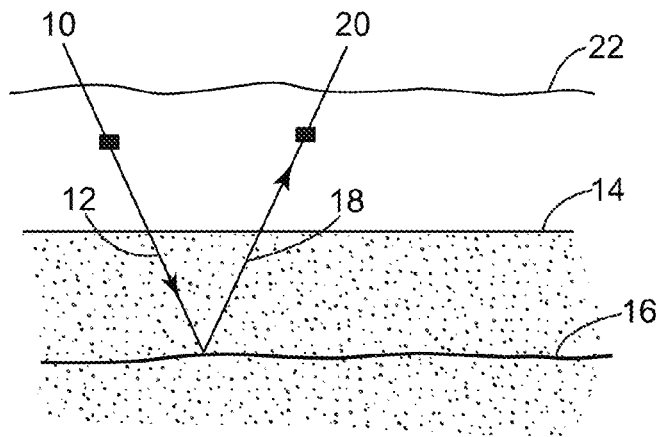
FIGS. 1A-C illustrate a primary component and multiples recorded with a seismic receiver.
Figure 1B:
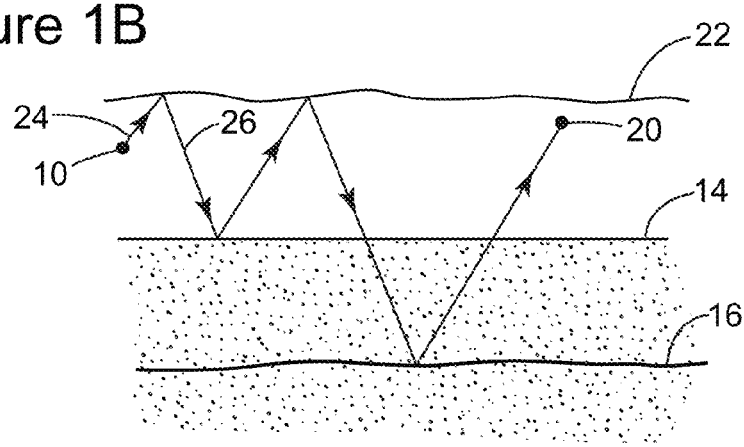
Figure 1C:
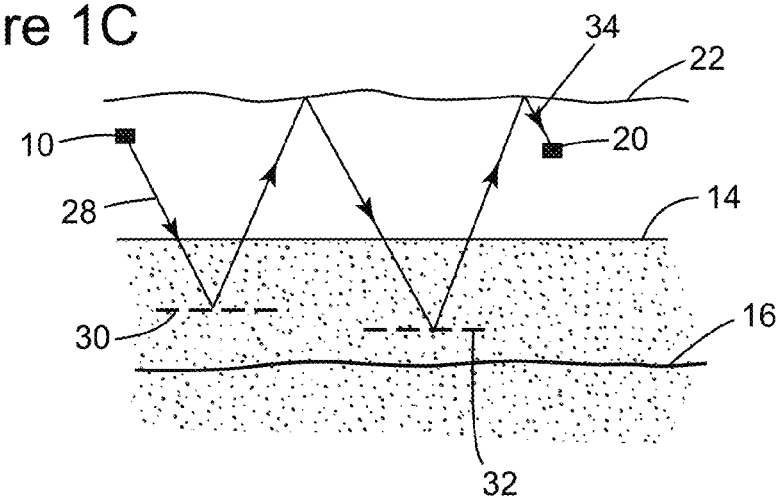
Figure 3:
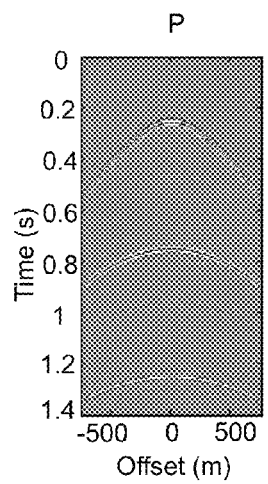
FIG. 3 illustrates synthetic data recorded with a hydrophone.
Figure 4:
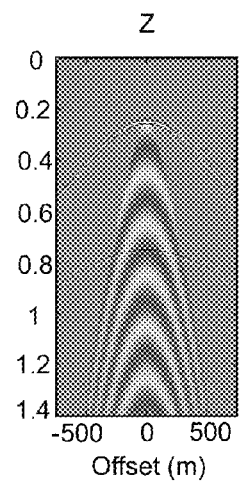
FIG. 4 illustrates synthetic data recorded with a geophone.

The above-noted novel processing algorithm is now discussed in more detail. According to a flowchart illustrated in FIG. 2, the novel algorithm includes a step 200 of receiving seismic data. The received seismic data includes a Z component and a P component. For example, FIG. 3 shows a synthetic P component and FIG. 4 shows a synthetic Z component. The received seismic data is recorded, for example, with the receivers 20. Each receiver may include a hydrophone to record the P component and a geophone to record the Z component. This data includes noise and multiples. In step 202, various processing steps may be applied prior to separating the up- and down-going waves. For example, the P and Z components may be debubbled (see, Wood et al., "The debubbling of marine source signatures," Geophysics, 1978), i.e., a debubbling operator is applied to the data for removal of bubble oscillations from the data. Bubble oscillations are a consequence of the nature of the seismic source, i.e., airguns that produce a large bubble that oscillates for a limited amount of time.

Figure 5:
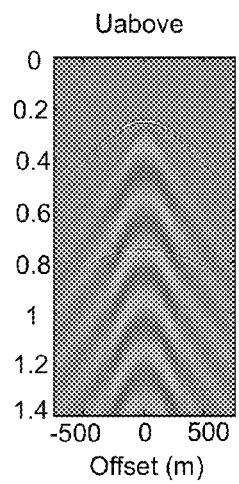
FIGS. 5 and 6 illustrate up-going and down-going components separated from the data of FIGS. 3 and 4 according to an exemplary embodiment.
Figure 6:
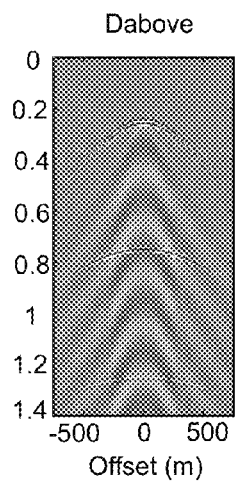

Next, in step 204, the wave-field separation is applied to the seismic data to obtain the up-going U and the down-going D waves. FIG. 5 shows the U component and FIG. 6 shows the D component. The wave-field separation may be performed, either in a conventional manner or by simultaneously applying an initial noise attenuation to partially remove noise while preserving signal content.

The obtained up- and down-going wave-fields are affected by the noise present on the Z component. The wave-field separation may be performed just above or below the ocean-bottom. It is noted that both the U and D wave-fields are affected by both the noise and the multiples. Optionally, in step 205, a directional designature (see, G. A. Roberts and N. R. Goulty, 1990, "Directional deconvolution of marine seismic reflection data, North Sea example," Geophysical Prospecting) may be applied to the P component. This step may be achieved by deconvolving the P component with a muted version of the D wave-field that includes data from the direct arrival to just above the first order water bottom multiple only, or by conventional methods.

In step 206, up-down deconvolution is performed using, for example, an imperfect estimate of up-going and down-going energy (e.g., energy corresponding to the U and D components) corrupted by the noise or residual noise. One way to perform up-down deconvolution is described by L. Amundsen in "Wavenumber-based filtering of marine point source data," Geophysics, vol. 58, no. 9, 1993, the entire content of which is included herein by reference.

Figure 7:
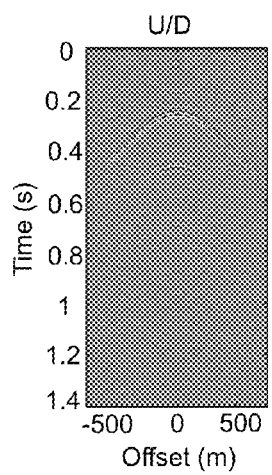
FIG. 7 illustrates an up-down deconvolution calculated according to an exemplary embodiment.

Recalling that the energy associated with the D component can be considered as the energy entering the earth during the seismic survey, and R is the response of the earth to the energy corresponding to the D component, the energy corresponding to the U component may be written as U=D*R, where the operation "*" is understood to mean convolution. The up-down deconvolution result R is then defined by R=U/D, where "/" is understood herein to mean the deconvolution operation. The result of this step is illustrated in FIG. 7. However, there are other ways to calculate R as will be recognized by those skilled in the art.

Next, a multiple model M is generated in step 208. There are various ways to determine the multiple model M. For example, it is possible to obtain the model M based on modeling or based on the Surface-Related Multiple Elimination (SRME) model. Alternatively, a novel way for generating the multiple model M is now discussed. According to an exemplary embodiment, it is possible to use the up-down deconvolution R, the P component and a redatuming term to generate the M model M. Thus, in this case, the model M is given by F(R, P, $\Delta Z$), where F is a function, and $\Delta Z$ is related to the datuming and this term expresses a vertical distance between where the model M is calculated and the ocean-bottom. A concrete definition of the model M is given, for example, in the f-k (frequency-wave) domain as being $M=R*P*e^{-jk_2 2\Delta z}$. It is noted that another definition is true if another domain is used. The model M may be expressed not only in the f-k domain but also in other domains that are customary in the art, e.g., tau-p.

Figure 8:
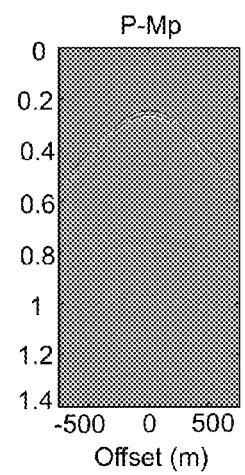
FIG. 8 illustrates a pressure component from which multiples and noise were removed according to an exemplary embodiment.

Having the multiple model M, the novel algorithm adaptively subtracts in step 210 the model M from the pressure component P. The P component is chosen as this component can be considered to be noise-free. Thus, step 210 performs at once noise attenuation and multiple attenuation. The result of this step is an estimate of the pressure field $P_{free}$ free of source and receiver side multiples and noise and this result is illustrated in FIG. 8. It is noted that the $P_{free}$ component illustrated in FIG. 8 is better than the original P component illustrated in FIG. 3.

As noted above, step 208 may be performed in a variety of domains. This is also true for step 210 and for other steps.

Thus, the seismic data at any step can be transformed into these domains either on a gather-by-gather basis or locally, in user-selected sliding windows. Further, various mathematical tools may be used to adaptively subtract the model M from the P component. It is known in the field of signal processing that the adaptive subtraction of a model M from a dataset involves the calculation of a set of data-derived operators that match the model to the data using one or more of a variety of criteria. For example, an L1 or L2 norm may be used. The seismic data may be transformed to any domain as appropriate for the problem at hand, with or without sparseness constraints. The adaptive subtraction can be performed using a variety of windowing criteria and a variety of filter dimensions. For example, 1D, 2D or 3D filters may be used. Adaptive subtraction parameters should be chosen so that multiples and noise are attenuated while the primary energy is preserved.

Other implementations of the proposed method are possible. For example, the estimate R of the primary wave-field may be obtained using an integral method as proposed by Amundsen (Amundsen, "Elimination of free-surface related multiples without need of a source wavelet," Geophysics, 2001) instead of up-down deconvolution. Additionally, a multiple model M may be calculated using a more complex redatuming process than the one specified above, to account, for example, for water velocity variations and sea bottom topography. Various redatuming methods are discussed in the literature (see, for example, Berryhill, "Submarine Canyons-Velocity replacement by wave-equation datuming before stack," Geophysics, 1986).

A novel concept of the proposed method is to use both the pressure P component and the vertical Z component recordings to derive the multiple model M, and then adaptively subtract the obtained model M from the pressure component P for simultaneous noise and multiple suppression under the assumption that the P component is of good signal quality while the vertical component is corrupted by noise.

Based on the calculated $P_{free}$, a final image of the surveyed subsurface may be generated in step 212. Of course, the calculated $P_{free}$ may be used for other purposes during the processing of the seismic data.

One novel aspect of the above-discussed algorithm is that it avoids time-consuming efforts that the conventional methods are performing for accurate pre-separation noise attenuation. In other words, if noise is attenuated pre-separation, the assessment of noise attenuation quality requires the execution of wave-field separation, up-down deconvolution and stacking. Several separations, up-down deconvolution and stacking attempts may be necessary to evaluate a set of alternative parameters in difficult scenarios.

Using the novel method, separation and up-down deconvolution can be carried out with an initial noise attenuation applied, while accurate denoising occurs post-separation and post-up-down deconvolution, when assessing adaptive subtraction parameters is easier because the data is ready for stacking. As discussed above, the novel method may also be applied to streamer data. Further, although the method assumes that noise is not present on the hydrophone component P while the noise corrupts the vertical geophone component Z, the method can also be modified to include the case where noise is present in the P component and not in the Z component.

Figure 9:
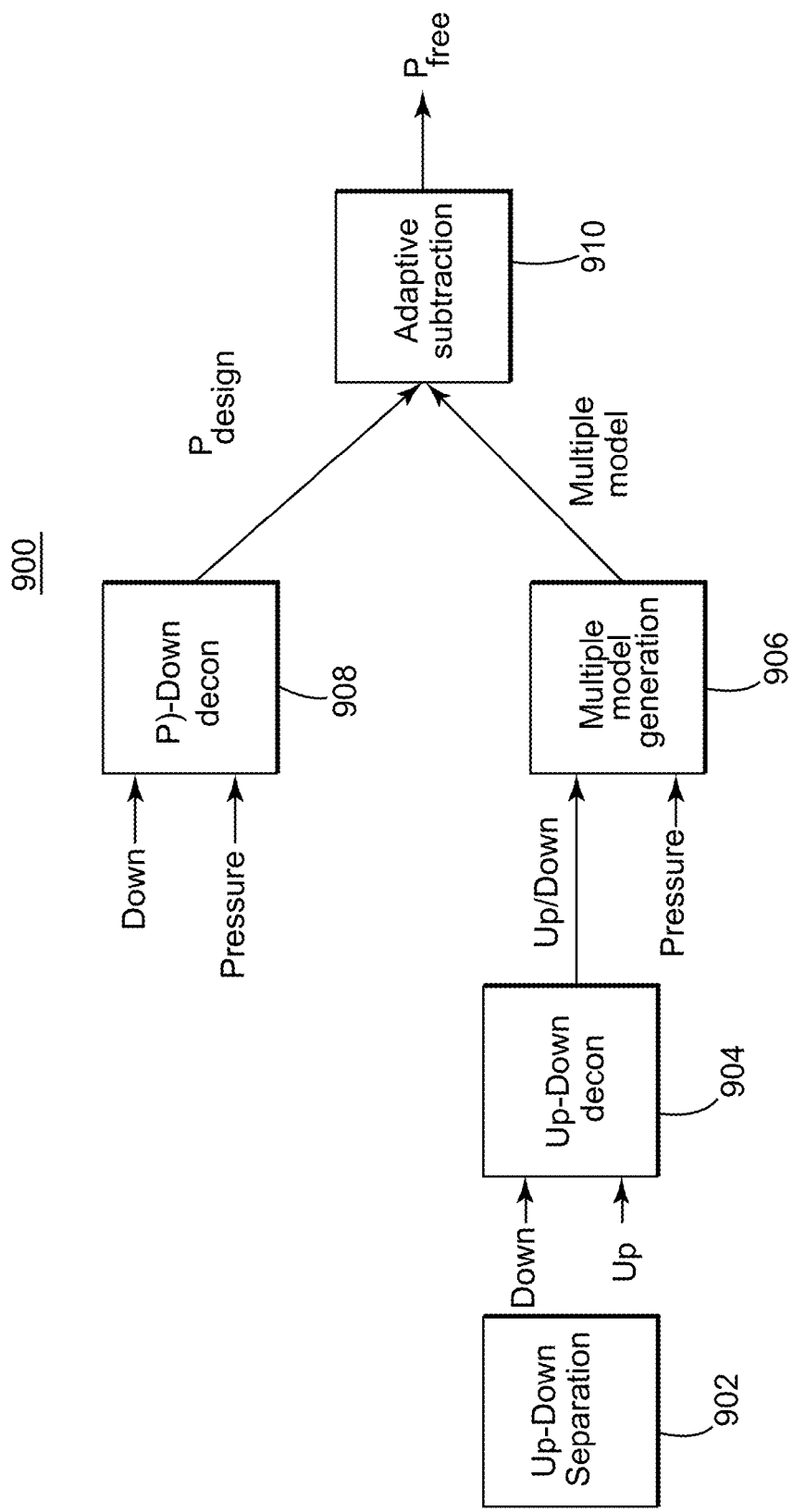
FIG. 9 is a schematic diagram of a novel algorithm for removing noise and multiples from seismic data according to an exemplary embodiment.

A more complex algorithm for jointly removing the noise and attenuating the multiples is now discussed with regard to FIG. 9. FIG. 9 schematically shows the steps to be performed for achieving the pressure $P_{free}$ component. It is noted that most of these steps have already been discussed above and thus, they are simply mentioned in the next description.

The novel algorithm 900 includes a part 902 that determines the up- and down-going components U and D from the input seismic data. These components are supplied to a computing device (to be discussed later) for performing the up-down deconvolution R in a part 904 of the novel algorithm. The resulting up-down deconvolution R is provided, together with the pressure P component (or the debubbled pressure component) to a part 906 for determining the multiple M model. A part 908 of the novel algorithm receives the down-going D component (e.g., from time zero to first order multiple) and the pressure P component (or the debubbled pressure component) and calculates the directionally designatured $P_{design}$ component.

Both the directionally designatured $P_{design}$ component and the multiple M model are provided to a part 910 of the novel algorithm that performs the adaptive subtraction of the model M from the directionally designatured $P_{design}$ component. The result of this calculation is the demultipled, designatured and denoised pressure $P_{free}$ component. It is noted that the above-noted parts 902 to 910 may be implemented in software, hardware or a combination thereof. For example, each part may be implemented in a corresponding module of a computing device or in a same processor of the computing device.

Figure 10:
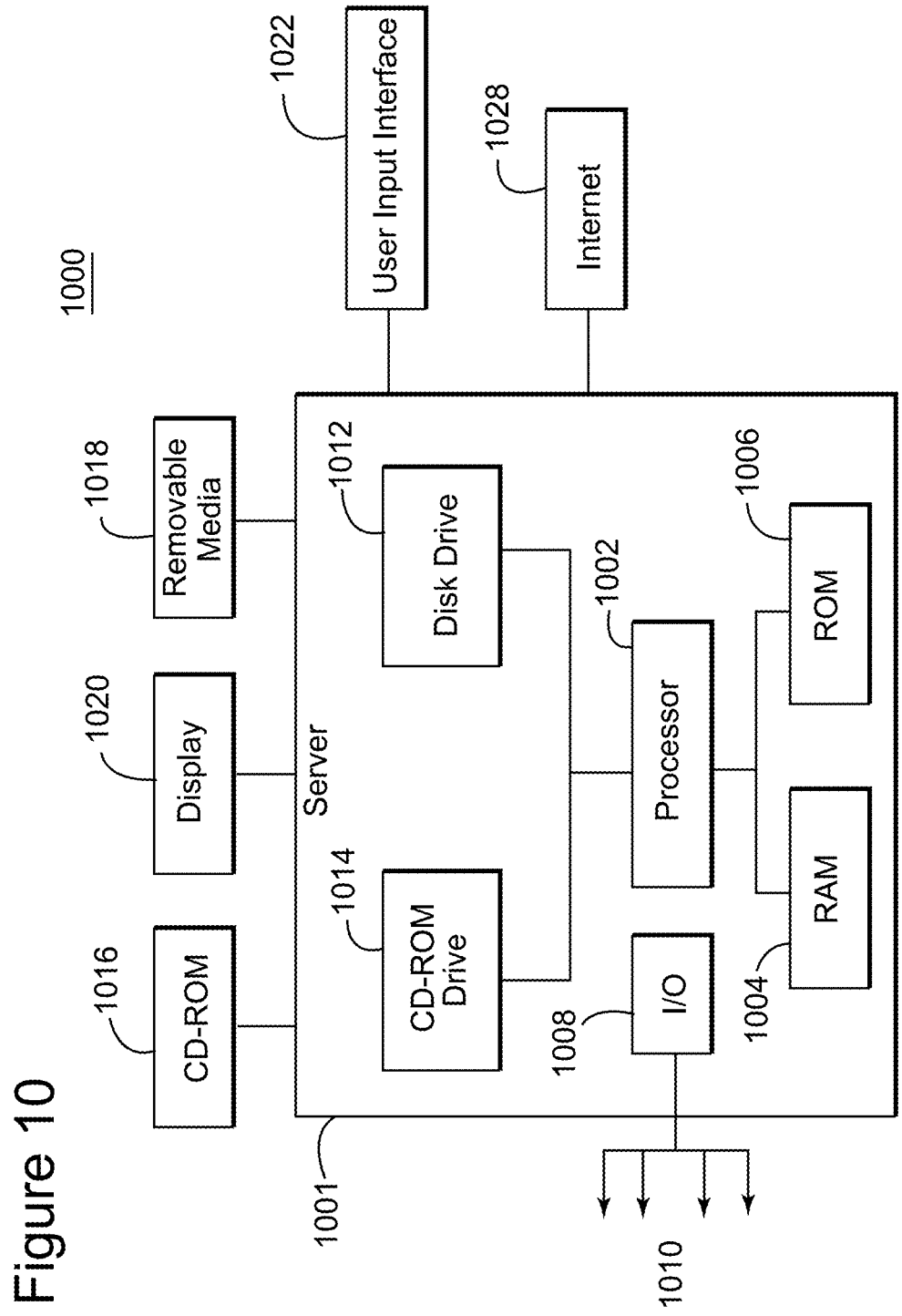
FIG. 10 is a schematic diagram of a computing device for performing the novel algorithm according to an exemplary embodiment.

An example of a representative computing device capable of carrying out operations in accordance with the exemplary embodiments discussed above is illustrated in FIG. 10. Hardware, firmware, software or a combination thereof may be used to perform the various steps and operations described herein.

The exemplary computer device 1000 suitable for performing the activities described in the exemplary embodiments may include a server 1001. Such a server 1001 may include a central processor unit (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

The server 1001 may also include one or more data storage devices, including hard disk drives 1012, CD-ROM drives 1014, and other hardware capable of reading and/or storing information such as a DVD, etc. In one embodiment, software for carrying out the above-discussed steps may be stored and distributed on a CD-ROM or DVD 1016, removable media 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD or LED displays, plasma displays, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices via a network. The server may be part of a larger network configuration as in a global area network (GAN) such as the Internet 1028.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized including hard disks, CD-ROMs, digital versatile discs (DVD), optical storage devices, or magnetic storage devices such a removable disk or magnetic tape. Other non-limiting examples of computer-readable media include flash-type memories or other known types of memories.

The disclosed exemplary embodiments provide an apparatus and a method for simultaneously denoising and reducing multiples in seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for simultaneously denoising and attenuating multiples in seismic data recorded with seismic receivers, the method comprising:
receiving the seismic data, wherein the seismic data includes a pressure P component and a vertical Z component;
separating the seismic data into up-going U wave-fields and down-going D wave-fields;
calculating an up-down deconvolution R based on the up-going U and the down-going D wave-fields;
generating a multiple model M based on the up-down deconvolution R; and
adaptively subtracting the multiple model M from the pressure P component to obtain a corrected pressure $P_{free}$ component from which simultaneously the noise and the multiples were removed,
wherein a multiple is a wave-field that propagates from a source to a receiver and experiences more than one reflection.

2. The method of claim 1, wherein the pressure P component is measured with a hydrophone and the vertical Z component is measured with a geophone or accelerometer and both components include noise and multiples.

3. The method of claim 1, wherein the step of calculating the up-down deconvolution R comprises:

deconvolving the up-going U and the down-going D wave-fields such that R=U/D.

4. The method of claim 1, wherein the step of generating the multiple model M comprises:
defining the multiple model M, in a frequency-wavenumber domain, as a product of the up-down deconvolution R and the pressure P component.

5. The method of claim 4, further comprising:
redatuming the product of the up-down deconvolution R and the pressure P component with an exponential that includes a wavenumber $k_z$ and a vertical distance $\Delta z$, where the vertical distance defines a distance between an ocean-bottom and a point where the multiple model M is calculated.

6. The method of claim 1, further comprising:
applying a debubbling operator to the pressure P component and the vertical Z component prior to separating the seismic data.

7. The method of claim 1, further comprising:
applying directional designature of the pressure P component before calculating the up-down deconvolution R.

8. The method of claim 7, wherein the directional designature comprises:
deconvolving the pressure P component with a muted version of the down-going D component.

9. The method of claim 8, further comprising:
adaptively subtracting the multiple model M from the designatured pressure component to obtain the corrected pressure $P_{free}$.

10. A computing device for simultaneously denoising and attenuating multiples in seismic data recorded with seismic receivers, the computing device comprising:
an interface configured to receive the seismic data, wherein the seismic data includes a pressure P component and a vertical Z component; and
a processor connected to the interface and configured to,
separate the seismic data into up-going U wave-fields and down-going D wave-fields,
calculate an up-down deconvolution R based on the up-going U and the down-going D wave-fields,
generate a multiple model M based on the up-down deconvolution R, and
adaptively subtract the multiple model M from the pressure P component to obtain a corrected pressure $P_{free}$ component from which simultaneously the noise and the multiples were removed,
wherein a multiple is a wave-field that propagates from a source to a receiver and experiences more than one reflection.

11. The computing device of claim 10, wherein the pressure P component is measured with a hydrophone and the vertical Z component is measured with a geophone or accelerometer and both components include noise and multiples.

12. The computing device of claim 10, wherein the processor is further configured to:
deconvolve the up-going U and the down-going D wave-fields such that R=U/D.

13. The computing device of claim 10, wherein the processor is further configured to:
define the multiple model M, in a frequency-wavenumber domain, as a product of the up-down deconvolution R and the pressure P component.

14. The computing device of claim 13, wherein the processor is further configured to:
redatum the product of the up-down deconvolution R and the pressure P component with an exponential that includes a wavenumber $k_z$ and a vertical distance $\Delta z$, where the vertical distance defines a distance between an ocean-bottom and a point where the multiple model M is calculated.

15. The computing device of claim 10, wherein the processor is further configured to:
apply a debubbling operator to the pressure P component and the vertical Z component prior to separating the seismic data.

16. The computing device of claim 10, wherein the processor is further configured to:
apply directional designature of the pressure P component before calculating the up-down deconvolution R.

17. The computing device of claim 16, wherein the processor is further configured to:
deconvolve the pressure P component with a muted version of the down-going D component.

18. The computing device of claim 17, wherein the processor is further configured to:
adaptively subtract the multiple model M from the designatured pressure component to obtain the corrected pressure $P_{free}$.

19. A computer readable medium configured to permanently store computer instructions such that, when a computer executes the instructions, to simultaneously denoise and attenuate multiples in seismic data recorded with seismic receivers (20), the instructions comprising:
receiving the seismic data, wherein the seismic data includes a pressure P component and a vertical Z component;
separating the seismic data into up-going U wave-fields and down-going D wave-fields;
calculating an up-down deconvolution R based on the up-going U and the down-going D wave-fields;
generating a multiple model M based on the up-down deconvolution R; and
adaptively subtracting the multiple model M from the pressure P component to obtain a corrected pressure $P_{free}$ component from which simultaneously the noise and the multiples were removed,
wherein a multiple is a wave-field that propagates from a source to a receiver and experiences more than one reflection.

20. The medium of claim 19, wherein the pressure P component is measured with a hydrophone and the vertical Z component is measured with a geophone and both components include noise and multiples.

* * * * *